May 14, 1946.    S. J. LINDSKOG    2,400,204
LAWN RENOVATING MACHINE
Filed March 13, 1944    2 Sheets-Sheet 1
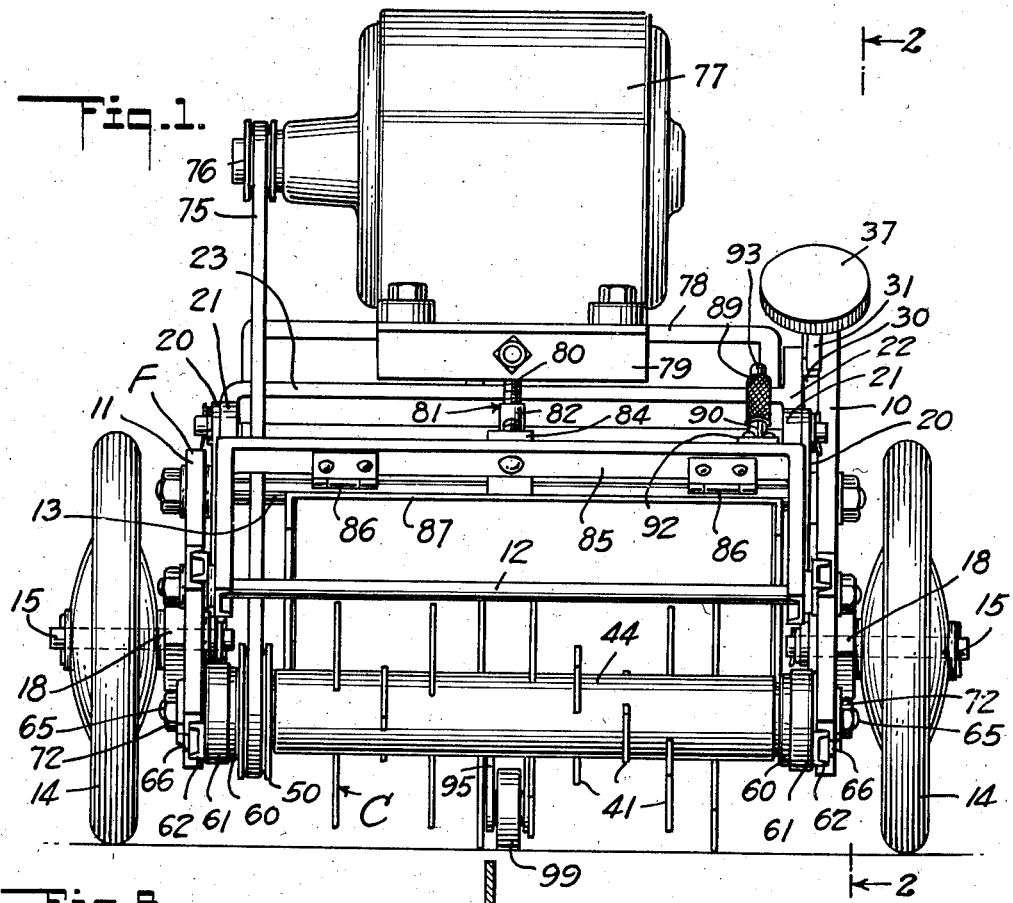
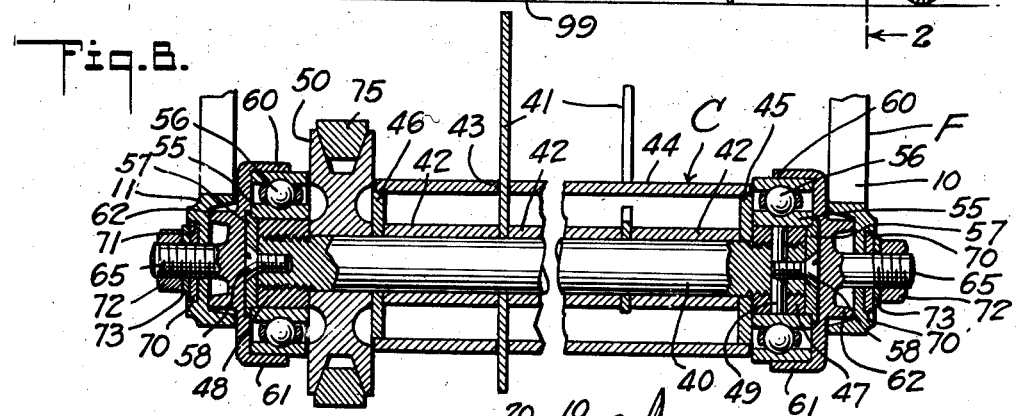
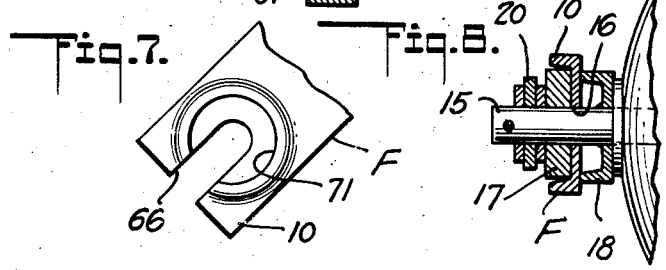
INVENTOR.
SEGFRID J. LINDSKOG
BY
Frederick Diehl
ATTORNEY

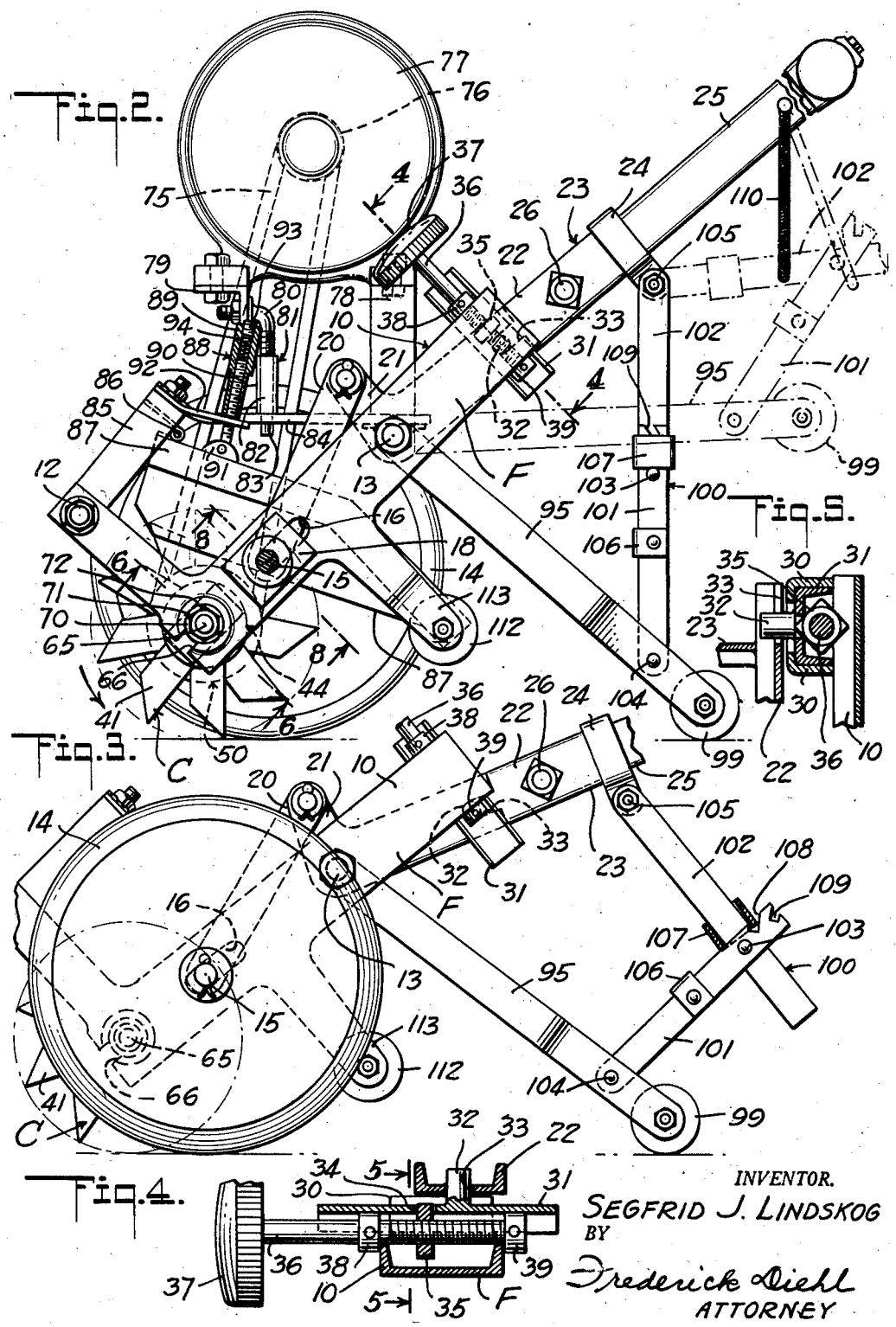

Patented May 14, 1946

2,400,204

UNITED STATES PATENT OFFICE 2,400,204

LAWN RENOVATING MACHINE

Segfrid J. Lindskog, Los Angeles, Calif.

Application March 13, 1944, Serial No. 526,226

4 Claims. (Cl. 97—40)

This invention relates to lawn renovating machines of the general character embodied in my application for Letters Patent filed September 8, 1941, under Serial No. 410,015, which has matured into Patent No. 2,253,345, and discloses and claims a machine for removing pest growths such as Bermuda grass and other ground-creeping runners and vines from lawns.

An object of the present invention is to provide a lawn renovating machine which is structurally characterized by novel and ingenious means rendering the machine capable of being conveniently and quickly adjusted to vary the depth of the cutting action of its rotary cutting element with respect to the lawn surface, in order that a light, medium, or heavy cut can be taken depending on the thickness of the pest growth, soil conditions, etc.

A further object of the invention is to provide a lawn renovating machine whose rotary cutting element is demountably associated with the machine for removal of the element as a unit therefrom, and convenient disassembling of the element to inspect its anti-friction bearings and replaces worn cutting blades with ease and dispatch, all while insuring that in its installed position, the cutting element will be rigidly supported and will be maintained in a centered and alined relationship to its driving mechanism and to all other parts of the machine with which it must be operatively associated to function with maximum efficiency.

Another object of the invention is to provide a lawn renovating machine which can be conveniently rolled idly from one place to another with its cutting element sufficiently elevated from the ground to prevent damage to the element; and which includes a guard or deflector for the cuttings, mounted and rendered adjustable to control the discharge of cuttings from the cutting element, for most efficient operation of the element and convenience of the operator.

With these and other objects in view, the invention resides in the combinations and arrangements of elements as set forth in the following specification and particularly pointed out in the appended claims.

In the accompanying drawings,

Figure 1 is a view of the lawn renovating machine in front elevation;

Figure 2 is a vertical sectional view taken on the line 2—2 of Figure 1, and with a depth setting or predetermining means adjustable for a relatively light cut;

Figure 3 is a fragmentary view similar to Figure 2, but with the depth setting means adjusted for a relatively heavy cut;

Figure 4 is an enlarged sectional view taken on the line 4—4 of Figure 2;

Figure 5 is a fragmentary detail sectional view taken on the line 5—5 of Figure 4;

Figure 6 is an enlarged fragmentary sectional view of the cutting element and its mounting, taken on the line 6—6 of Figure 1;

Figure 7 is a fragmentary detail view in elevation of a portion of the machine frame with which the cutting element is alined and centered; and Figure 8 is a detail sectional view taken on the line 8—8 of Figure 2.

Referring specifically to the drawings, the invention in its present embodiment comprises a frame F composed of two side channel members 10 and 11 rigidly connected and spaced in parallism by tie rods 12 and 13 for co-action in providing a mounting for a working or cutting element C and for a pair of wheels 14. These wheels are journaled on the outer portions of stub axles 15, the inner portions of which project through slots 16 in the frame members 10 and 11, and are welded, brazed, or otherwise fixed to inner and outer guide blocks 17 and 18 slidable against opposite sides of the frame members to mount the wheels for adjustment on the frame F vertically with respect to the cutting element C, to vary the depth of cut to be taken by the latter, all in a manner to be later described.

Links 20 are pivotally connected at one end to the inner end portions of the axles 15, and are pivotally connected at the other end to arms 21 projecting from the side members 22 of a yoke 23 pivotally mounted by means of its side members on the tie rod 13, and having a socket 24 in which the lower end of a handle 25 is secured by a bolt 26, for guiding of the machine by an operator when holding the handle at a convenient angle in trailing relation to the machine.

At its upper end and inner side, the member 10 of the frame F is provided with spaced tracks 30 (Figure 5) forming a guideway for a channel slide 31 having a pin 32 projecting into a slot 33 in the upper end of one of the members 22 of the handle yoke 23, to operatively connect the latter to the slide. The slide 31 is also provided with an opening 34 receiving a corner portion of a nut 35 (Figure 4) through which is threaded a feed screw 36 having a knob 37 and being confined between the slide and frame member 10 against axial displacement, by collars 38 and 39 fixed to the screw to abut opposite side edges of the member 10 as shown in Figures 2 and 4.

Rotation of the knob 37 will cause the screw 36 to feed the nut 35 and hence the slide 31 longitudinally of the screw so that the pin 32 of the slide will co-act with the slot 33 in the yoke member 22 to pivot the handle 25 about the axis of the tie rod 13 and to shift the stub axles 15 in the slots 16 through the medium of the links 20 and arms 21, thus changing the vertical relationship of the cutting element C to the wheels 14 so as to vary the depth of cut to be taken by the element. As the nut 35 cannot drive the screw 36, the cutting element will be locked in any position of vertical adjustment relative to the wheels.

The cutting element C (Figure 6) comprises an axle 40 passing through center openings in double ended cutting blades 41 spaced apart on the axle by sleeves 42, and maintained in helical relationship by passing through helically arranged slots 43 in an open ended blade reinforcing and guard cylinder 44 within which the axle 40 is maintained centered by disks 45 and 46 fitting snugly in the ends of the cylinder 44 as clearly shown in Figure 6.

The ends of the axle 40 which project from the cylinder 44 are threaded to receive nuts 47 and 48, with the nut 47 permanently fixed to the axle by a diametric pin 49 and abutting the disk 45 so as to provide a shoulder or enlargement on one end of the axle. Between the other removable nut 48 and the cylinder 44 is a driven pulley 50. By means of the nut 48, the pulley 50, disks 45 and 46, sleeves 42 and cutting blades 41 are clamped tightly together so as to rotate as a single rigid unitary structure.

Mounted on the nuts 47 and 48 are the inner races 55 of anti-friction bearings 56, which races are supported in co-axial relationship to the axle 40 by annularly flanged centering disks 57 entering the races and secured to the axle by screws 58 whose flat heads seat in countersunk openings in the disks, and whose shanks are screwed into the ends of the axle. The outer races 60 of the bearings 56 seat in cup-shaped housings 61 having diametric tongues 62 adapted to fit between the webs of the frame members 10 and 11 to prevent rotation of the housings relatively thereto. Projecting from the tongues 62 co-axially of the housings are attaching studs 65 which are adapted to enter slots 66 formed in the frame members 10 and 11 (Figures 1 and 7) opening to the lower ends of the members.

Mounted on the studs 65 are centering washers 70 which are adapted to seat in annular centering recesses 71 formed in the outer sides of the frame members 10 and 11, with the slots 66 radially related to the recesses. The outer ends of the studs 65 are threaded to receive nuts 72 which co-act with other washers 73 and with the centering washers 70 to rigidly secure the housings 61 and hence the bearings 56 in alinement when the centering washers seat in the recesses as shown in Figure 6.

Trained about the pulley 50 is a belt 75 also trained about a driving pulley 76 on the shaft of an electric motor 77 rigidly secured to brackets 78 and 79. The bracket 78 is of U shape, and is mounted on the tie rod 13, whereas the bracket 79 is secured to the upper section 80 of a longitudinally adjustable post 81, the lower section 82 of which is a sleeve nut receiving the upper section and being reduced in diameter at its lower end to provide a shank 83 seating in an opening in a brace member 84 secured at one end to the tie rod 13, and at its other end to a U-shaped bracket 85 mounted on the tie rod 12. By rotating the nut section 82 of the post 81 in one direction or the other, the motor 77 will pivot about the axis of the tie rod 13 so as to be raised or lowered and hence to increase or decrease the tension of the belt 75 to obtain maximum power transmitting efficiency therefrom.

Hinged at 86 on the bracket 85 is a guard or deflector 87 which covers the upper portion of the cutting element C and projects downwardly and rearwardly thereof as shown in Figure 2. The guard 87 is suspended from the hinges 86 for vertical pivotal adjustment about the latter by a hanger 88 composed of an upper rotatable section 89 forming a sleeve nut, and a lower threaded section 90 pivoted on an ear 91 on the bracket 84, and passing freely through an opening in an arm 92 on the bracket 85 into the section 89. A screw plug 93 closes the upper end of the section 89 so as to releasably retain the nut in a selected position of adjustment. By means of the adjustable hanger 88, the guard 87 can be raised or lowered to deflect cuttings from the element C more or less downwardly to prevent clogging of the element with cuttings, and to compensate for different vertical positions of the element in making cuts of various depths.

Pivotally mounted on the tie rod 13 is a ground engaging member in the form of a yoke arm 95, at the lower end of which is journaled a small wheel 99. A longitudinally adjustable strut 100 connects the arm 99 with the handle 25 and comprises two sections 101 and 102 pivotally connected together at 103 and respectively connected pivotally at 104 and 105 to the arm 99 and handle 25 as shown in Figures 2 and 3.

Pivotal movement between the sections 101 and 102 in one direction to a position in which they are in parallelism and from a strut of maximum length is limited by a stop 106 on the section 101, and the sections are adapted to be releasably retained in this position by a sleeve 107 which is slidably mounted on the section 102 and is adapted to receive the overlapping portions of both sections as shown in Figure 2.

With the strut 100 adjusted to dispose its sections 101 and 102 in the minimum operative angular relationship shown in Figure 3, the sleeve 107 is adapted to enter a notch 108 in the section 101 to lock the sections in this position, whereas with the strut adjusted to a position intermediate those shown in Figures 2 and 3, the sleeve 107 is adapted to enter a second notch 109 in the section 101 to lock the sections in such position.

It will be clear that with the wheels 14 and the wheel 99 resting on a flat surface such as a sidewalk, adjustment of the strut from the straight position shown in Figure 2 will lower the handle 25 and hence raise the cutting element C by virtue of pivotal movement of the handle 25 about the axis of the wheels 14. Assuming for example, that a light cut is to be taken, and that the strut 100 is in the position of adjustment shown in Figure 2, the knob 37 is rotated until the cutting element is lowered sufficiently to touch the flat surface on which the machine is resting, and as clearly shown in Figure 2.

The strut 100 is now raised to the idle position shown in broken lines in Figure 2, and is maintained in this position by a spring wire coil stirrup 110 suspended from the handle 25 and adapted to be stretched over the strut. As the working position in which the handle 25 is normally maintained by the operator during operation of the machine is slightly higher than that resulting from the above described adjustment of the cutting element, the latter will be lowered slightly from the position shown in Figure 2 so as to take a light cut in the lawn surface.

However, with the strut adjusted as in Figure 3, and the cutting element C further lowered by adjustment of the knob 37, as also shown in this figure, the handle 25, when held in the same operating position by the operator as above described, will lower the cutting element a considerably greater distance so that the element will take a deeper or heavier cut in the lawn surface. Thus it will be clear that the strut 100 and its associated parts constitute a setting or gauging means to approximately predetermine the depth of cut which will be taken with the handle 25 held by the operator at the angle most convenient for guiding the machine as it is pulled forwardly over the lawn by rotation of the cutting element in the counterclockwise direction of the arrow in Figure 2.

It will be noted that small idler wheels 112 are journaled in arms 113 projecting from the frame members 10 and 11, and are adapted to co-act with the main supporting wheels 14 in providing a four wheel support on which the machine can be rolled from one place to another with the cutting element sufficiently elevated to be protected against damage.

It will be clear that by virtue of the construction and mounting of the cutting element C as above described, the element is rendered quickly demountable from the frame F for any maintenance operation required, and is rigidly supported in the frame with the bearings 56 in alinement, and the axle 40 in parallelism with the shaft of the motor 77 so as to insure maximum mechanical efficiency.

I claim:

1. In a machine of the class described, a frame; a working element mounted in the frame; wheels; means rotatably mounting the wheels on the frame and for adjustment relatively thereto in a vertical direction when the machine is in a working position, to vary the vertical relationship of the wheels and working element; a handle; means pivotally mounting the handle on the frame for adjustment to vary its upward and rearward angular relationship to the frame; a feed screw journaled in the frame; a slide mounted in the frame and operatively connected to the handle; a nut carried by the slide and threaded on the feed screw for actuation of the slide to angularly adjust the handle in response to rotation of the feed screw; and means operatively connecting said wheel mounting means to the handle, by which said adjustment of the latter will vertically adjust the wheels a predetermined amount.

2. In a machine of the class described, a frame; a working element mounted in the frame; wheels; means rotatably mounting the wheels on the frame and for adjustment relatively thereto in a vertical direction when the machine is in a working position, to vary the vertical relationship of the wheels and working element; a handle; means pivotally mounting the handle on the frame for adjustment to vary its upward and rearward angular relationship to the frame; a feed screw journaled in the frame; a slide mounted in the frame and operatively connected to the handle; a nut carried by the slide and threaded on the feed screw for actuation of the slide to angularly adjust the handle in response to rotation of the feed screw; said wheel mounting means including axles for the wheels; and links operatively connecting the axles to the handle by which said adjustment of the latter will vertically adjust the wheels a predetermined amount.

3. In a machine of the class described, a frame; a working element mounted in the frame; wheels; means rotatably mounting the wheels on the frame and for adjustment relatively thereto in a vertical direction when the machine is in a working position, to vary the vertical relationship of the wheels and working element; a handle; means pivotally mounting the handle on the frame for adjustment to vary its upward and rearward angular relationship to the frame; means co-acting with the frame and handle by which the latter can be adjusted and locked in a selected position of angular adjustment relative to the frame; means operatively connecting said wheel mounting means to the handle, by which said adjustment of the handle will effect a predetermined vertical adjustment of the wheels; an arm pivotally mounted on the frame co-axially of the handle and having a ground-engaging portion; and a longitudinally adjustable strut operatively connected to said member and handle, by which the latter can be selectively supported in vertically different angular positions relative to the ground, to enable the working depth of said element to be varied in response to a predetermined vertical adjustment of the wheels.

4. In a machine of the class described, a frame; a working element mounted in the frame; wheels; means rotatably mounting the wheels on the frame and for adjustment relatively thereto in a vertical direction when the machine is in a working position, to vary the vertical relationship of the wheels and working element; a handle; means pivotally mounting the handle on the frame and for adjustment to vary its upward and rearward angular relationship to the frame; means co-acting with the frame and handle by which the latter can be adjusted and locked in a selected position of angular adjustment relative to the frame; means operatively connecting said wheel mounting means to the handle, by which said adjustment of the handle will effect a predetermined vertical adjustment of the wheels; an arm pivotally mounted on the frame co-axially of the handle and having a ground-engaging wheel; pivotally connected strut sections; means respectively connecting the strut sections to said arm and handle respectively, for adjustment of the strut sections to dispose the handle in vertically different angular positions relative to the ground; and means for releasably retaining the strut sections in a selected position of adjustment, whereby to enable the working depth of said element to be varied in response to a predetermined vertical adjustment of the wheels.

SEGFRID J. LINDSKOG.